United States Patent

[11] 3,536,111

| [72] | Inventor | Ben E. Rasmusson<br>12510 S.E. 62nd Place, Bellevue, Washington 98004 |
|---|---|---|
| [21] | Appl. No. | 792,326 |
| [22] | Filed | Jan. 21, 1969<br>Division of<br>Ser. No. 555,810, June 7, 1966. |
| [45] | Patented | Oct. 27, 1970 |

[54] FOOD MOLDING MACHINE AND ASSOCIATED FILLING MECHANISM
7 Claims, 13 Drawing Figs.

[52] U.S. Cl. .................................................. 141/183, 107/1; 141/129
[51] Int. Cl. ..................................................... B65b 1/24
[50] Field of Search ........................................... 141/129, 183; 107/1, 8(All); 222/381, 142, 146

[56] References Cited
UNITED STATES PATENTS

| 1,246,180 | 11/1917 | Taylor | 141/183X |
| 1,993,367 | 3/1935 | Geyer | 141/183X |
| 2,520,719 | 8/1950 | Hanson | 141/183 |
| 2,541,907 | 2/1951 | Appling | 141/183 |
| 2,621,844 | 12/1952 | McBean et al | 141/138 |

Primary Examiner—Walter A. Scheel
Assistant Examiner—Robert I. Smith
Attorney—Graybeal, Cole and Barnard

ABSTRACT: Automated confection forming equipment adapted for forming food products and comprising food mix dispensing apparatus including a carriage mounted hopper with plural piston cavities below the hopper and piston means reciprocating in the cavities to dispense metered amount of food mix through nozzle means into aligned receptacles of the confection forming equipment without crushing any fragile constituent of the mix such as puffed or toasted cereals, nut meat, and the like. Control means are provided coordinating the movements of the receptacles and the food mix so the receptacles move intermittently and the dispenser nozzles move into the associated receptacles and inject mix into the receptacles while the receptacles are stopped. Movement of the dispenser components and the sequencing control therefor are preferably effected by a pneumatic power system.

Patented Oct. 27, 1970

INVENTOR.
BEN E. RASMUSSON

Graybeal, Cole & Barnard
ATTORNEYS

INVENTOR.
BEN E. RASMUSSON
ATTORNEYS

Patented Oct. 27, 1970

INVENTOR.
BEN E. RASMUSSON

Graybeal, Cole & Barnard
ATTORNEYS

3,536,111

FOOD MOLDING MACHINE AND ASSOCIATED FILLING MECHANISM

CROSS-REFERENCE TO RELATED APPLICATIONS

This application is a division of applicant's U.S. application Ser. No. 555,810, filed June 7, 1966, and entitled Automated Forming of Molded, Nonrefrigerated Food Products, Feeder Mechanism Therefor, and Products Formed Thereby. Another application Ser. No. 792,598, also a division of said U. S. application 555,810, and entitled Food Dispensing Apparatus is being filed concurrently herewith.

The present invention relates in general to the automated forming of unfrozen food products such as confections and the like on equipments conventionally used to form stick-embedded frozen confections, such as the type of equipment disclosed in Rasmusson U.S. Pat. No. 3,031,978 and known as the Vitaline. More particularly, the invention relates to combinations of food mix dispenser mechanism with an automated confection forming equipment, the dispenser being operated and sequenced to enter the molds and deliver the food mix to the molds of the forming equipment during periods of mold stoppage. Other aspects of the invention relate to the particularized operating conditions for such equipments, whereby such are adapted for automated formation of unfrozen molded products.

Frozen confections are now commonly manufactured on a variety of equipments, such as the Vitaline, Gram, Nelson and Polarmatic equipments. In general, these equipments conventionally involve delivery of a liquid mix into molds, then freezing of the mix in the molds in a cooling section, with the frozen products being released from the molds by brief heating of the molds, the formed frozen confections then being withdrawn from the molds by means of withdrawal of the sticks embedded therein.

At present, many such frozen confection making equipments are used only seasonally in that the market for frozen confections is seasonal to a great extent. A basic object and purpose of the present invention is to provide equipment and operating modifications whereby such equipments need not be idle during the off-season and can be employed to full capacity any time not needed for production of frozen confections, to manufacture unfrozen food products on an automated basis. It is a further object and purpose of the present invention to provide a feeder mechanism for use in conjunction with automated food product molding equipments, which is capable of nondestructively delivering measured amounts of a conglomerate plastic mass of a food composition, even if the composition includes fragile particles such as puffed or toasted cereals, nut meats, or the like.

Food mixes dispensed and formed by the apparatus of the present invention are typically characterized by the presence of a preponderant quantity of solid or semisolid food particles such as dried cereals, dried fruits, freeze-dried fruits, nuts, nut meats, grains, puffed grains, precooked meat, and the like, together with an uncooked fluid binding agent which is liquid above about body temperature and solid at room temperature, which may be composed of a mixture including selected vegetable oils having a flow point of about 96°F., liquid slurries of reconstituted milk solids, flours, starches, sugar and/or cocoa, with lecithin stabilizers, hydrolized yeast, emulsifiers, flavoring and the like, the binding agent being present in sufficient quantity to coat each food particle at least lightly. Various types of food products are contemplated, such as mixes to form; (1) cookie type products wherein the particulated food particles include puffed or aerated cereals, and in which the binder can be so-called confectioner's compound coating having a melting point of about 96°F. or slightly higher; (2) candy type products wherein the solid particles are preformed candies, marshmallows or creams, together with the indicated binding agent; (3) candy type products with or without included solid particles, such as nougats and fondants; (4) parlor snacks, wherein the food particles are meat, bread, grains, nuts and the like and in which the binder may be hydrogenated vegetable oils in combination with flours, starches, stabilizers and the like; (5) so-called heat-and-eat snacks, wherein the particulated food particles are precooked meat particles with a fluid binder which may be vegetable oils, aqueous slurries of reconstituted egg solids, starches or gums, or the like; and (6) raw, uncooked meats wherein the fluid binder is the natural meat juices, either alone or in combination with an added fluid binder such as above recited in connection with precooked meat mixes.

It is a further object and advantage of the present invention to provide feeder mechanism repetitively delivering multiple amounts of a plastic conglomerate mass to the successively presented banks of molds of a conventional frozen confection forming machine, which feeder mechanism incorporates means for maintaining the conglomerate mix in a condition of plastic flow, means for segregating and enclosing a measured amount of the mix, means for injectively delivering the enclosed amount of mix from associated novel means into the receptacle means, and movement sequence controlling means which can be cyclically operated either independently or in timed relation to an associated equipment such as a conventional frozen confection forming machine.

It is the related and specific object of the feeder mechanism of the present invention to have the capability of automatically and successively feeding measured amounts of a conglomerate mix, wherein the conglomerate mix is plastic or semisolid in nature and contains fragile food particles such as puffed or toasted cereals, nut meats or the like, without substantial destruction or compression of the fragile particles, with such feeding occurring at high throughput rates consistent with the production speeds normally attainable by conventional food product forming equipment.

It is a related and more specific object and advantage of the present invention to provide feeder mechanism for plastic food mixes, particularly solid particle entrained plastic food mixes, wherein the feeder mechanism comprises a reciprocating plunger assembly on carriage means in turn cyclically reciprocated to cause nozzle means associated with such plunger assembly to physically enter into and be progressively withdrawn from mold type receptacle means during each mix injection cycle of the nozzle means.

These and other objects, features and advantages of the present invention will be apparent from the following description, appended claims and annexed drawing.

Referring to the drawing wherein like reference characters designate like parts throughout the several views.

Figure 1:
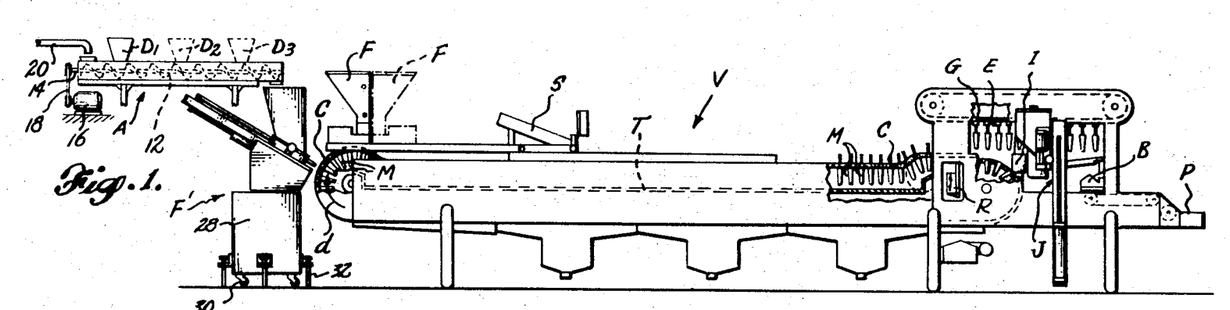
FIG. 1 is a somewhat schematic side elevational view of a typical assemblage of equipment incorporating the mechanism of the present invention, such equipment including a mixer arranged to discharge into the dispensing device of the invention, which in turn is arranged to discharge into the traveling molds of a conventional automated frozen stick confection machine.

In FIG. 1 a conventional Vitaline Model 6 frozen confection forming machine (selected by way of example to illustrate typical practice of the invention) is generally designated at V and includes a main conveyor assembly comprising a laterally spaced pair of main conveyor chains C which carry a series of product forming molds M, the molds M being arranged in laterally extending sets or banks of six molds each. Main conveyor chains C, moving stepwise in the direction indicated at $d$, conventionally move the molds progressively past one or more feeders or fillers F through a brine tank T wherein the liquid mix in the molds is frozen, with sticks being inserted into the partially frozen molds from a stick inserter S in the course of the mold travel through the brine tank T. With the frozen confection mix frozen in the molds M at the end of the course of travel thereof through the brine tank T, vertically reciprocated defrost tank means R heats the molds and releases the molded products from the molds M, and the molded products are separated from the molds M by an associated vertically reciprocated extractor bar E engaging the embedded sticks and lifting the products out of the molds M by movement of the extractor bar E through an upward stroke. The extractor bar carrying the sticks and formed products then meshes into an extractor bar conveyor G which then moves the formed products to an optional and conventional dip coater station I and then to an optional dry coater station J, which suitably can involve a dry coater such as disclosed and claimed in my U.S. Pat. No. 3,307,517. At the discharge end of the extractor bar conveyor G in the upper conveyor section of the equipment, the products are released from the extractor bars by a tripping mechanism (not shown), whereupon the products fall into bags in a bagger assembly B and are thereafter conveyed to a packaging station P.

In general terms, to the extent such need be now considered for an understanding of the invention, there is also shown in FIG. 1 a plastic or semisolid food product mixer A and dispenser mechanism F'. Mixer A comprises a heated, screw conveyor type blender 12 mixing solid ingredient inputs from dispensers $D_1$, $D_2$, $D_3$ with the fluid binder ingredients being delivered through conduit 20, the resulting mix being discharged to hopper 22 of the dispenser mechanism F', which in turn also comprises a bank of outlet nozzles 66 through which the mix is multiplicately discharged into the successive banks of molds M of the Vitaline machine V.

The specific construction and manner of operation of the mixer A and the feeder F' are discussed in more detail in the portion of this description following the discussion of the operation of the overall equipment, as next presented.

Plastic or conglomerate food product mixes utilized in practice of the invention can include as part thereof certain particulated solids and also an uncooked fluid binding agent which is in solid state at room temperature and which is in fluid state when heated to temperatures at and above about body temperature. Considered collectively, the food product mix selected to illustrate an operating example of the method aspects of the invention includes what may be termed a "milk mix" portion and a "solids mix" portion, wherein the "milk mix" contains the following constituents:

26.00 vegetable oils (flow point 96°F.)
28.80 sucrose sugar
14.60 nonfat milk solids
0.40 flavoring (Vanilla)
0.20 lecithin
70.00 total and wherein such "solids mix" contains the following:

20.00 crisp rice (expanded).

The above "milk mix" typical of what is known in the trade as Confectioner's Compound Coating, was heated to a controlled temperature of about 100°F., and pumped into the inlet conduit 20 of the mixer A and the solids mix was metered into the mixer A by feed from the hoppers $D_1$, $D_2$, $D_3$ thereof, with all portions of the mixer A being maintained at a temperature of about 110°F. to 130°F. Delivery of the mixed ingredients from the mixer A to the dispenser mechanism F' by action of conveyor 12 is regulated to maintain the level of the mix in the hopper 22 of the dispenser F' at a desired level, and the mix retaining elements of the dispenser F' in contact with the mix are in like manner maintained at an elevated temperature of about 110°F. to about 130°F. so that the conglomerate mix as it is discharged from the nozzles 66 into the molds M of the Vitaline equipment is in a plastic condition, and at a temperature in the range of from about 100°F. to about 130°F.

The dispensing apparatus F' is synchronously operated in conjunction with the Vitaline equipment, as discussed in detail hereinafter, principally in connection with the sequencing control diagrams presented at FIGS. 8 and 13, with the result that each of the molds M is substantially filled with the plastic conglomerate food product mix, being in effect injected or extruded thereinto by the feeder F'. Progressive operation of the Vitaline equipment then conveys each successive mold bank into the brine tank T which is maintained at a temperature suitable for the selected production rate of the equipment. As a practical matter, the cooling temperature encountered by the molds M and the brine tank T need not be below freezing, but is optimally below freezing, at about minus 10°F. for example, for realizing optimum product production rates. Experimentation has shown that the solidification or "setting" time of the above-selected conglomerate food mix, in relation to the temperature in the brine tank T, has been observed to be as follows for molds having a volume of three fluid ounces:

| Temperature: | Mix solid after, min. |
|---|---|
| 72° F. (room temp) | 20 |
| 55° F. (water cooling) | 10 |
| 40° F. (chilled water) | 8 |
| 30° F. (brine cooling) | 6 |
| 0° F. (brine cooling) | 5 |
| −10° F. (brine cooling) | 4 |
| −30° F. (brine cooling) | 3 |

With the Vitaline equipment V being operated at the rate of 16 cycles or steps per minute and with the molds being in banks six molds wide (producing some 480 dozen molded products per hour), maintenance of the temperature of the brine tank T at −10°F. resulted in the mix in the filled molds being receptive to having sticks inserted from sticker S about 1½—2 minutes after filling, and complete solidification of the conglomerate mass to the point where the sticks were rigid in the mass after about 4 minutes. With a standard 18 foot brine tank T as conventionally employed in the Vitaline model 6, the solidifed molded food products are retained in the cooling section of the equipment longer than the 4 minutes indicated, and it will be readily understood that such equipment could either be shortened or the speed of operation thereof increased, with corresponding increase in production, if desired. In an actual production run during which the solidifed products course the brine tank T and emerge therefrom approximately 7½ minutes after filling, and with hot water circulating through the defrost tanks R at about 120°F.—°F., the formed products were released from the molds M in like manner as is characteristic of frozen product release, and then manipulated through the dip coating station H heated to 140°F., wherein a chocolate compound coating (formulated with fractionated cocoanut oil) was applied, after which an air jet was directed briefly down around each formed product to remove the excess coating. Because of the latent and relatively low temperature of the formed products the coating solidified quickly, i.e. within 15—25 seconds. Prior to complete solidification of the dip coating, a dry coating of nut meats or the like can be applied at dry coater station J, following which the formed products are discharged to bagger B and packaging station P in the usual manner.

Referring again to FIG. 1, the mixer A is schematically shown to include an elevated trough 10. The end of trough 10 distal the dispenser F' is closed, and the opposite end, which is proximal and above the feeder F', is open. An elongated rotary, ribbon screw type blender 12 is located in the trough 10, and is supported for rotation by means including a shaft 14. The shaft 14 is shown to project through, and extend outwardly beyond, the closed end of trough 10. The shaft 14, and in turn the blender 12, may be rotated by a motor 16, drivingly connected to the projecting end portion of the shaft 14 by a chain and sprocket or belt and pulley transmission 18, for example. The blender 12 comprises both mixing paddles and cut-folded screw vanes adapted to move the mixture from the closed to the open end of the trough 10, as illustrated.

In the example above discussed, the binder ingredient exists as a solid at room or ambient temperature and melts at a temperature substantially above ambient. As previously explained, the binder ingredient is heated until it is a liquid or at least a flowable plastic capable of mixing with and adhering to the usually dry particulate material. While in such liquid or flowable plastic state, the binder ingredient is delivered to the trough 10 by a conduit 20, and may be merely spilled into the trough 10, near the closed end thereof. The principle particulate ingredient, which may be dry puffed grain particles, for example, may be dispensed in measured amounts into the trough 10 by means of a dispenser D1 having a discharge portion situated closely adjacent the outlet end of conduit 20. A suitable dispenser D1 includes a hopper and a vibrator unit or an equivalent mechanism for moving the material from the hopper into the trough 10. Additional dispensers D2, D3 of the same or similar type may be used for delivering additional particulate ingredients into the trough, as will hereinafter be explained in some detail.

The trough 10 includes hollow wall portions (i.e. a jacket) through which hot water or steam may be circulated for the purpose of maintaining the ingredients at a proper temperature and consistency for mixing, and for maintaining the resulting mix in a flowable plastic state. As illustrated, the mix may merely spill out from the open end of trough 10 and free fall into the hopper 22 of the feeder F'.

In some installations it may be desirable to locate the trough 10, the feed pipe 22 and the dispensers D1, (and D2, D3, etc.) down close to the floor, so that they can be tended by an operator standing on the floor. In such installations the mix would be caught at the discharge end of trough 10 by a suitable elevating means, adapted for elevating and dumping the mix into the hopper 22 of the feeder F'.

The dispenser apparatus F' of the present invention is an accessory for, but is preferably a self-contained unit separate from, the frozen confection forming machine, whether it be a Vitaline type machine V or a different type. The dispenser F' is shown to include its own floor supported base 28 and a transfer mechanism supported by said base 28. The base 28 includes wheels or casters 30, so that it can be easily rolled into and away from its position of use. Preferably, it also includes a set of vertically adjustable anchor legs 32. As will be evident, the legs 32 are adjusted to be above the floor when it is desired to use the casters. Then, when it is desired to fix the dispenser F' in position, the legs 30 are adjusted downwardly so that they contact the floor and the casters are lifted above the floor.

The dispenser mechanism F' is now specifically described. The hopper 22 is shown to be secured to, and to extend above, a reciprocating nozzle carriage 34. Carriage 34 includes a relatively thick plate 36 which serves as the bottom for the hopper 22, and is formed to include a plurality of feed rams or piston cavities 38 equal in number to number of molds M in each mold set or bank of the Vitaline machine V. The disposition or attitude of plate 36 is such that each ram cavity 38 is coaxially related to an associated mold M at the filling station of the Vitaline machine V.

By way of typical and therefore nonlimitive example, the nozzle carriage 34 is shown to be supported for reciprocal movement relative to its frame 40 by means of a pair of track and roller assemblies. In FIGS. 2—4, 6 and 7 the tracks are shown to be formed by the lower flanges 42 of a pair of channel members 44 secured along the side marginal portions of the plate 36. The rollers 46 are supported by short axles secured to the side walls 48 of the frame 40.

The carriage 34 is reciprocated by a piston-cylinder type fluid motor 50. In the illustrated embodiment, the cylinder 52 is secured to a fixed strut 54 interconnected between the walls 48 below the carriage 34, and the piston 56 is secured to a support plate 58 which in turn is secured to, and depends below, the carriage plate 36.

As previously mentioned, and as illustrated by FIGS. 2—7, the ram cavities 38 are preferably recesses formed in the upper part of the carriage plate 36. The cavities 38 are shown to be generally rectangular in cross section, and to each be in parallelism with the others. A flat rectangular bar 60 bridges across the cavities 38 at the nozzle end of the carriage, and a similar bar 62 bridges across the cavities 38 at the opposite end of the carriage. The hopper 22 may be secured to the carriage by a plurality of bolts, some of which are designated 64. These bolts extend first through front and rear lower flange portions 63, 65 of the hopper 22, then through the bridge plates 60, 64, and then anchor in the carriage plate 36.

A nozzle 66 is associated with each ram cavitiy 38. The nozzles 66 have flanged base portions which are secured to the front edge portion of the carriage plate 36, such as by bolts (not shown). Each nozzle possesses a central passageway which is substantially identical in cross-sectional size and shape to the tunnel portions of its cavity 38, below the bridge bars 60, 62.

Figure 2:
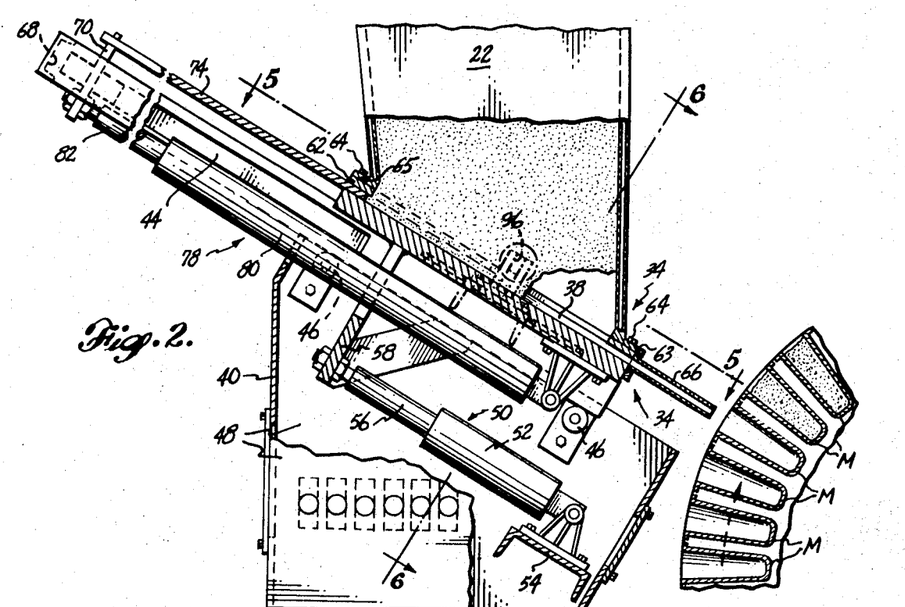
FIG. 2 is a view of a preferred form of the dispensing mechanism with some parts thereof appearing in side elevation, and with other parts thereof appearing in vertical section, taken substantially along line A–A of FIG. 5, such view showing both the nozzle carriage and the piston assembly in retracted positions relative to the molds of the frozen stick confection machine.
Figure 3:
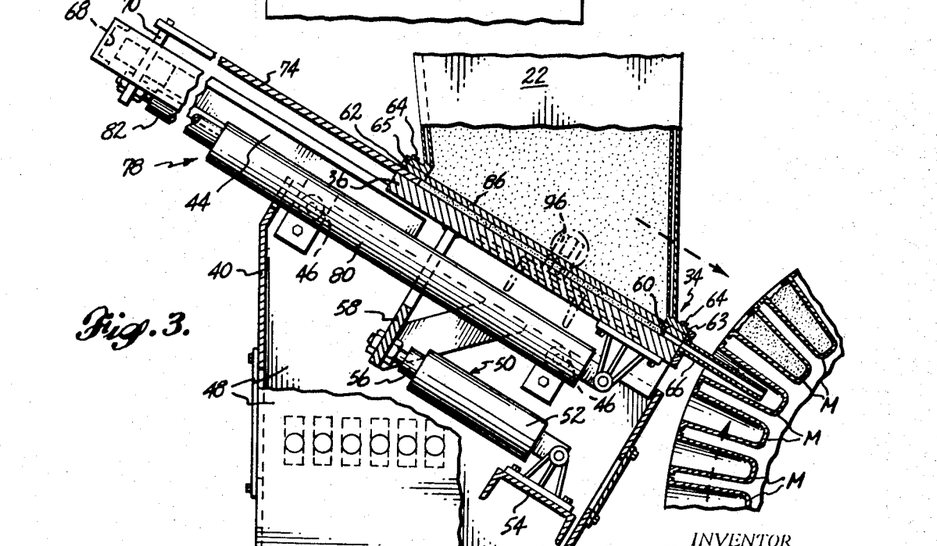
FIG. 3 is a view similar to FIG. 2, with the piston assembly still retracted, but with the nozzle carriage fully extended so as to place the nozzles relatively deeply into a set of molds in position to be filled.
Figure 4:
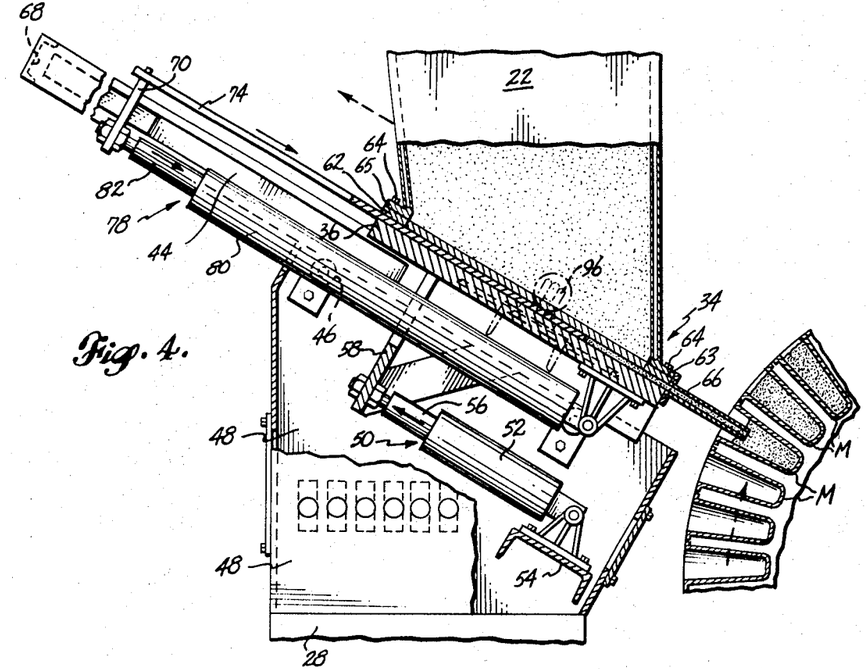
FIG. 4 is a view similar to FIGS. 2 and 3, but showing the nozzle carriage in a stage of retraction and the piston assembly in a stage of extension.
Figure 5:
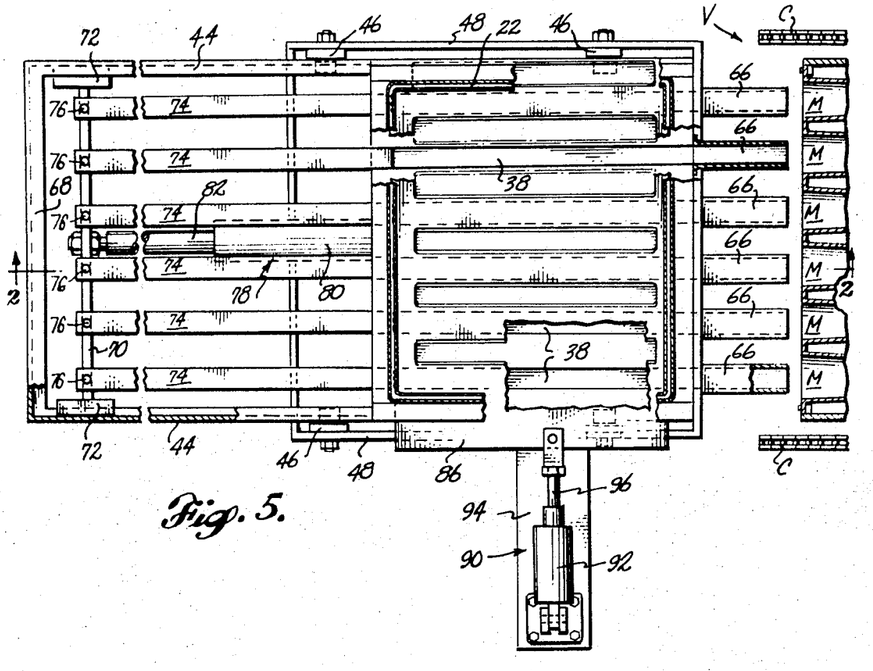
FIG. 5 is a top plan view of the dispensing mechanism, with certain foreground portions thereof broken away for the purpose of exposing certain other portions of the mechanism which are normally shielded from view by such foreground portions, and with the hopper being shown in oblique section, taken substantially along line 5–5 of FIG. 2.

As best shown by FIGS. 2, 4 and 5, the side rails or channels 44 of the carriage extend rearwardly a substantial distance (and in parallelism) from the carriage plate 36, and are interconnected at their rear ends by a transverse cross tie 68, also shown to be of channel form. The channels 44, in their extent rearwardly of the carriage plate 36, and the rear channel 68 together define a closed frame which supports and guides a reciprocating feed ram assembly.

Referring specifically to FIGS. 2—5, the feed ram assembly is shown to comprise a rear placed transverse tie bar 70. A sliding guide block 72 is secured at each end of the tie bar and is sized to fit snugly between the upper and lower flanges of the channels 44. The tie bar 70 constitutes a rear mount for a set of rams 74. Each ram 74 is sized to snugly fit within its recess 38, including in the tunnel areas thereof, below the bridge bars 60, 62. The rams 74 are long enough so that the forward portions thereof are always retained in the rear tunnel areas below the rear bridge bar 62, even when the ram assembly is in its rearmost position. The rear portion of each ram 74 may be secured to the tie bar 70 by a single bolt 76, for example.

The rams 74 are reciprocally moved axially through the cavities 38, and relative to the carriage, by means of a piston-cylinder type fluid motor 78. In the illustrated embodiment (FIGS. 2—4, for example), the cylinder 80 is secured to a central lower bottom portion of the carriage plate 36, and the piston 82 is secured to a lower central portion of the tie bar 70.

Figure 6:
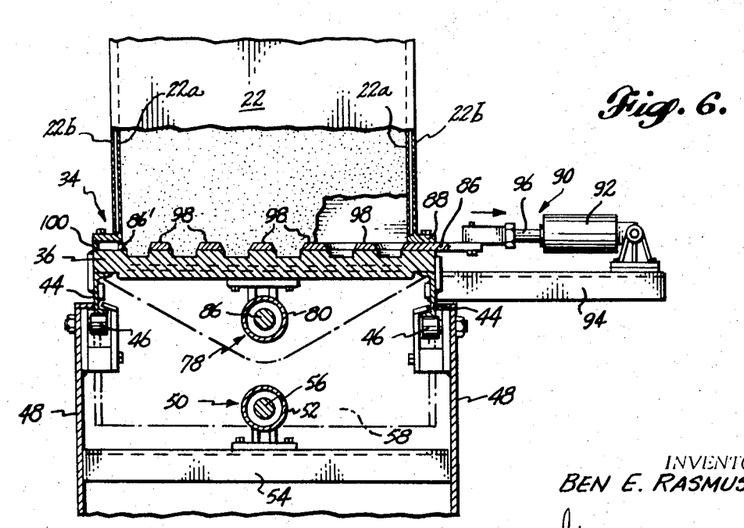
FIG. 6 is a sectional view taken through the mechanism perpendicularly to the plane of nozzle movement, and substantially along line B-B of FIG. 2, such view showing the reciprocatory valve plate in an open position and some of the mix in the piston cavities, into which it had gravitated.

As best shown by FIGS. 5 and 6, the cavities 38 are of upwardly opening channel form; they are open topped and open into the hopper 22. A closure plate 86 is provided to close the open tops of the cavities 38 during the periods of piston advancement. Plate 86 has a continuous border portion and includes a generally rectangular, closed ended cutout for each cavity 38. Plate 86 is of substantially the same thickness as the bridge bars 60, 62 and is mounted for reciprocal movement transversely of the cavities 38, in the space defined front to rear by the bridge bars 60, 62 and below by the carriage plate 36. An exposed end portion of plate 86 projects outwardly from a side tunnel area formed vertically by carriage 36 and a side flange 88 of hopper 22. Plate 86 is reciprocated by a piston-cylinder type fluid motor 90, comprising a cylinder 92 secured to the free end of a support arm 94, which in turn is cantilevered from channel 44 (FIG. 7), and a piston 96 secured to a central edge portion of the plate 86.

The border portions 86' of plate 86, and the bar portions 98 thereof between the cutouts, form individual closures for the cavities 38. Such closures may have beveled side edges that slope inwardly from the bottom up, so as to form entrances into the cutouts which are wider than the top openings of the cavities 38, for the purpose of facilitating gravitation of the mix into cavities 38. A fixed closure bar 100 may be secured between hopper 22 and carriage plate 36.

Figure 7:
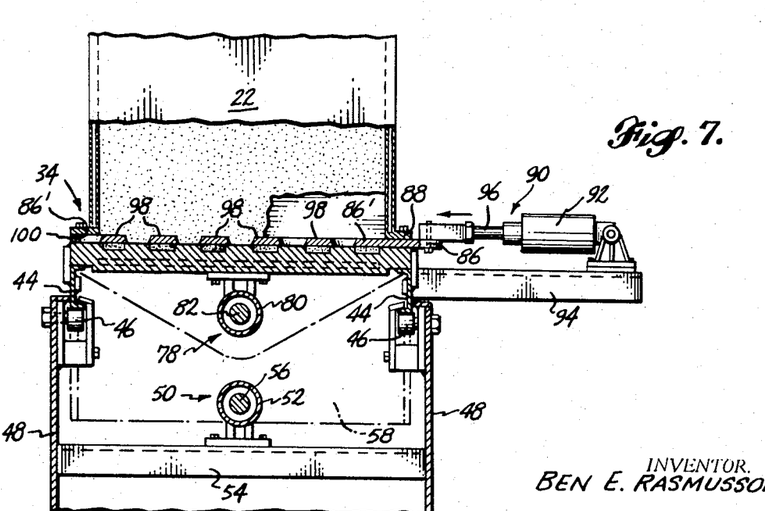
FIG. 7 is a view similar to FIG. 6, but showing the valve plate in a closed position, and a measured amount of the food mixture enclosed in each piston cavity.

FIG. 6 shows the piston 96 retracted, the closure bars 98, 86' positioned over the ridge or raised portions of plate 36, situated between the recesses 38, and the cutout in plate 86 aligned with the recesses 38, and forming funnellike entrances therefor. FIG. 7 shows the piston 96 extended and the closure bars 98, 86' in closed position over the cavities 38.

Hopper 22 is provided with means for maintaining the mix therein at a proper temperature and consistency for injection or extrusion through the nozzles 66. Preferably, heating means is incorporated in both the walls and bottom of the hopper 22. In FIGS. 2—7, 9 and 10, the walls of hopper 22 are shown to be in water jacket form: they comprise spaced apart panels 22', 22" defining an innerspace between them through which a heated fluid, e.g. hot water or steam is circulated. Carriage plate 36 is shown to include passageways 37 for a circulating heated fluid medium. Alternatively, electric heating means may be incorporated into the walls of the hopper 22 and/or the carriage plate 36. Also, an immersed type of heater may be used.

In operation of the equipment above described, a heated binder material (e.g. of a type that is solid at room temperature and melts at about body temperature) is delivered through conduit 20 into trough 10 and admixed therein with fragile particles of a solid or semisolid food substance (e.g. dried cereals) delivered into trough 10 by one or more of the dispensers D1, D2, D3. The blending screw 12 folds the components of the mix, and in that manner mixes them thoroughly, but does not crush the solid or semisolid food particles. In this respect, the nonrestricted discharge of the mix from trough 10 is important. Since the outlet of trough 10 is in no way restricted, no back pressure is developed which would tend to resist movement of the mix toward such outlet, and hence compaction and crushing of the fragile solid or semisolid particles is avoided.

Dispenser F' also handles and dispenses the mix in a way such that there is no compaction and substantially no crushing of the solid or semisolid particles. The mix freely gravitates into the recesses 38. Valve plate 98 does not crush the solid or semisolid particles as it moves because the mix is free to move with it. The nozzle passageways are at least the same size as the recesses 38. Thus, when the pistons 74 are extended they do not force the mix against converging nozzle walls which would create a back pressure and cause some compaction of the mix and crushing of the fragile particles. Rather, the nozzle passageways present only frictional resistance to the mix, and such resistance is nominal.

Figure 8:
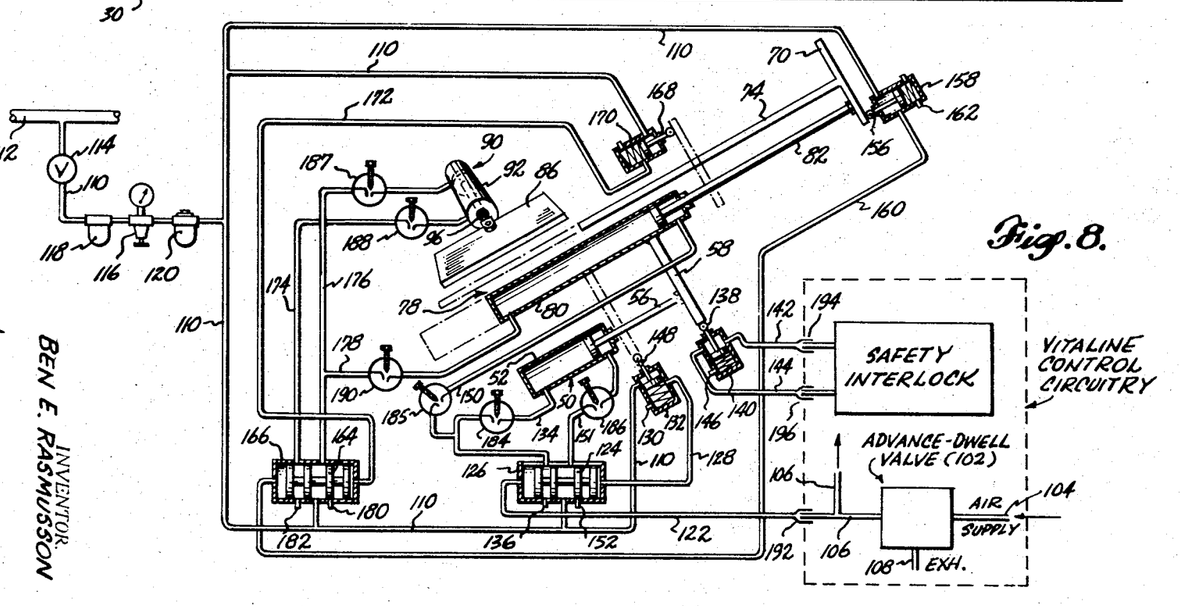
FIG. 8 is a schematic diagram of a typical pneumatic operating and control system for the mechanism.

The typical and therefore nonlimitive form of operational and control circuitry illustrated by FIG. 8 is next described. The basic Vitaline equipment typically employs a pneumatic control system, including an advance-dwell control valve 102, shown schematically by a box diagram (and identified as slave valve No. 3 in the pneumatic system schematic diagram for Models 6 and 8 found in the 6-5-63-75 Vitaline Model 6 Service Manual published by Vitafreze Equipment, Inc., Sacramento, California). During the initial portion of dwell periods of the mold carrying conveyor C, valve 102 communicates air supply line 104 with a control line 106, extending from valve 102 to the operators (not shown) of the components or optional accessories of the Vitaline machine which operate during the conveyor dwell periods, such as the defrost apparatus, the stick insertion cylinder, the conventional Vitaline liquid mix filler (designated F in FIG. 1), and a dry coater. During the final portion of the conveyor dwell periods, and during movement of the conveyors, valve 102 vents control line 106 to the atmosphere, via an exhaust port 108.

The illustrated form of pneumatic operation and control circuitry for the dispenser F' includes a supply conduit 110 leading from a source of compressed air, such as a main trunk 112 leading from an air compressor (not shown). Supply conduit 110 includes an off–on valve 114, a variable orifice, regulated pressure controlled, pressure regulator 116, a vapor trap 118, and an oiler 120.

In FIG. 8 the pistons 56 and 82 of carriage actuator 50 and feed ram actuator 78, respectively, are shown in extended positions, and piston 96 of closure plate actuator 78 is shown in a retracted position. This corresponds to the positions of these parts shown in FIGS. 2 and 6, and places the feeder carriage 34 in its retracted position, back away from the fill station of the Vitaline machine V, the feed rams 74 in retracted positions, and closure plate 86 in its piston-cavity open position.

As the start of a dwell period of the Vitaline mold conveyor C, pressurized air from Vitaline line 106 is communicated via feeder control line 122 with the left end (as pictured) of spool 124 of control valve 126. The opposite end of spool 124 is subjected to atmospheric pressure, the communication to atmosphere being made through control line 128 and exhaust port 130 of a first limit valve 132. The higher pressure in line 122 moves spool 124 to the right (as pictured), communicating supply conduit 110 with the rod side of piston 56 in cylinder 52. The opposite or bare side of piston 56 is vented to the atmosphere via control line 134 and exhaust port 136 of valve 126. As piston 56 moves to the left (as pictured), and is retracted into its cylinder 52, the filler carriage is extended, placing nozzles 66 in the molds M then at the fill station of the Vitaline machine.

When filler carriage 34 is in its retracted position away from molds it contacts and depresses operator 138 of a limit valve 140 forming a part of a safety interlock circuit. Valve 140 is in series in the Vitaline signal circuit which supplies pressurized air to cause advancement of mold conveyor C. As long as operator 138 is depressed Vitaline control line 144 is in communication (through valve 140) with the Vitaline control line 144, and the Vitaline advance signal circuit is completed. However, when operator 138 is released it moves upwardly, shuts off communication between lines 142 and 144, and vents line 142 to the atmosphere via exhaust port 146. As long as line 142 is vented to the atmosphere, the control means that would advance the Vitaline conveyor C is inoperative. Hence, advancement of the Vitaline conveyor C is prevented until the filler carriage 34 once again returns to its retracted (*i.e.* FIG. 2) position.

When filler carriage 34 is fully extended, and nozzles 66 are in the molds M, the carriage 34 contacts and depresses operator 148 of limit valve 132. This communicates supply manifold 110 with control line 128 leading to the right end (as pictured) of valve spool 124. At this point of time, the Vitaline advance-dwell valve 102 has functioned to vent control line 106, 122 to the atmosphere, and thus valve spool 124 is moved to the left by the higher pressure in control line 128. This puts control line 151 and the rod side of piston 56 in communication with the atmosphere through exhaust port 152, and both the bare side of piston 56 and the rod side of piston 82 are put in communication with the supply manifold 110 via control lines 134, 150, respectively. As a result, the filler carriage 34 commences to back up or retract at the same time the feed pistons or rams 74 commence to advance, resulting in the mix being fed into the molds M concurrently with nozzle withdrawal from the molds M (FIG. 4).

As the piston carriage 70, 74 leaves its retracted position it releases operator 156 of limit valve 158, putting control line 160 in communication with the atmosphere via exhaust port 162 of valve 158, and blocking flow into valve 158 via supply manifold 110. At this point both ends of the valve spool 164 of control valve 166 are vented to the atmosphere. The pressure on spool 164 is equalized, and it stays to the right side of valve 166 in the position illustrated.

When the feed ram assembly 70, 74 reaches the end of its advancement, it contacts and depresses operator 168 of limit valve 170. As operator 168 moves inwardly it functions to communicate supply manifold 110 with control line 172, and in turn the right end of valve spool 164, at a time when the left-hand side thereof is still vented to the atmosphere. Valve spool 164 is moved to the left by the pressure differential, resulting in supply manifold 110 being put into communication with control line 174 leading to the rod side of piston 96, and control lines 176, 178 being vented to the atmosphere via exhaust port 180 of valve 166. Piston 96 is retracted and moves closure plate 86 to a cavity open position (FIG. 6). The piston cavities are closed during advancement of the rams 74, retraction of the fill carriage, and dispensing or extrusion of the mix.

As illustrated, control lines 134, 150, 151, 174, 176 and 178 are provided with variable orifice flow regulators 184, 185, 186, 187, 188 and 190, respectively. Control line 174 is vented to the atmosphere through exhaust port 182 of valve 166 when spool 164 is positioned as illustrated. Filler control lines 122, 142 and 144 may be connected to their corresponding parts of the Vitaline circuitry by coupling means 192, 194, 196, respectively.

In the dispenser mechanism embodiment of FIGS. 2—8 the feed rams 74 can be advanced substantially completely through the nozzles 66. Feed rams 74 are preferably constructed of metal except at the free ends thereof, whereat a Teflon or similar plastic tip is provided. Such end portion may be secured to the free ends of the pistons in the same manner as the portions of the split pistons illustrated by FIGS. 9—11, and described below.

Figures 9, 10, 11, 12:
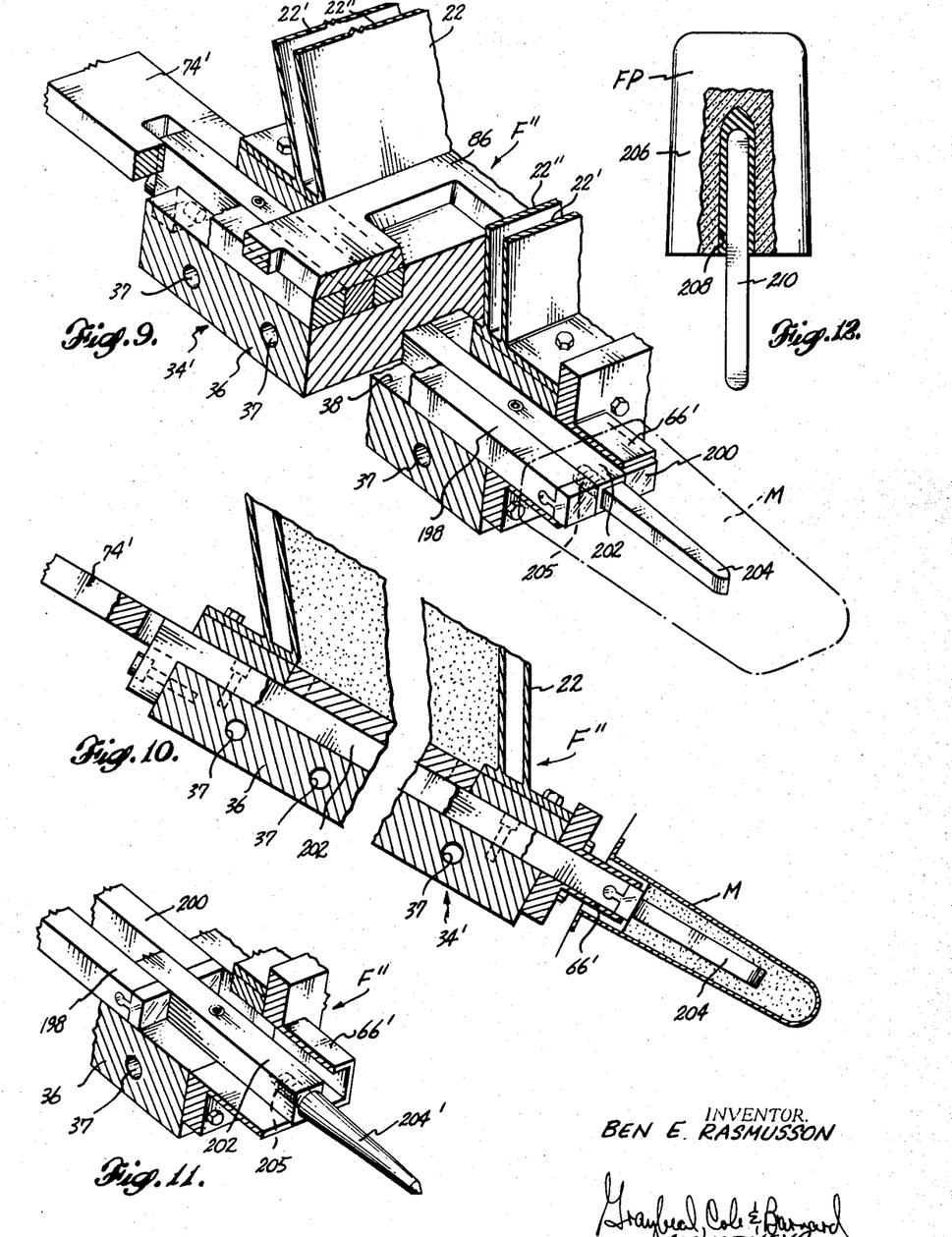
FIG. 9 is a fragmentary view of a bottom portion of the hopper, showing another form of piston, of split or forked form, a central island member that is secured to and movable with the nozzle carriage and mounts a secured displacement needle for forming a cavity in the molded product.
FIG. 10 is a fragmentary side elevational view of the assembly of FIG. 9, showing both the piston and the nozzle in their extended positions.
FIG. 11 is a view taken from the same aspect as FIG. 9, but of only the nozzle region of FIG. 9, such view showing the forked piston in a stage of retraction, and further showing the split or forked construction of the nozzle and a modified form of displacement needle.
FIG. 12 is a view of a stick confection manufactured by equipment including the nozzle and piston equipped dispenser depicted by FIGS. 9—11.

Referring now to FIGS. 9—11, the various feeder parts illustrated thereby are in most respects the same as those illustrated by and described in conjunction with FIGS. 1—8, with the exception of the construction and operation of the feed rams.

The feed rams 74' are of split or forked construction, and comprise at least a pair of tines 198, 200. The space between the tines 198, 200 is filled by a spacer or island member 202 that is secured to the carriage plate 36. In this form the nozzles 66' are shorter than the nozzles 66, and enter only a short distance into the molds M. However, the fixed island member 202 mounts a tapered prong 204 which does enter a substantial distance into the mold M. The prong 204, which is preferably fabricated from or coated with a nonsticking material such as Teflon, functions to prevent a complete filling of the mold M by the mix from hopper 22, so that a cavity remains, where prong 204 once was, after such prong is withdrawn from the mold M. This cavity is then later filled by a different but compatible food composition, as will hereinafter be explained in greater detail.

Cavity forming prong 204 may be of a gradually tapering rectangular form, as illustrated by FIGS. 9 and 10, or it may be of a gradually tapering rounded form (FIG. 11). Also it need not be centrally located, as illustrated, and a plurality of prongs may be provided. For securing it to the island member 202, the prong 204 (or prongs) may include a threaded root 205 mateable with a threaded socket formed in the end of member 202. The free ends of the tines 198, 200, may be provided with plastic tips 198', 200', *e.g.* Teflon, and such tips 198', 200' may be secured to the tines 198, 200 by a locking mortise and tenon joint, for example.

Figure 13:
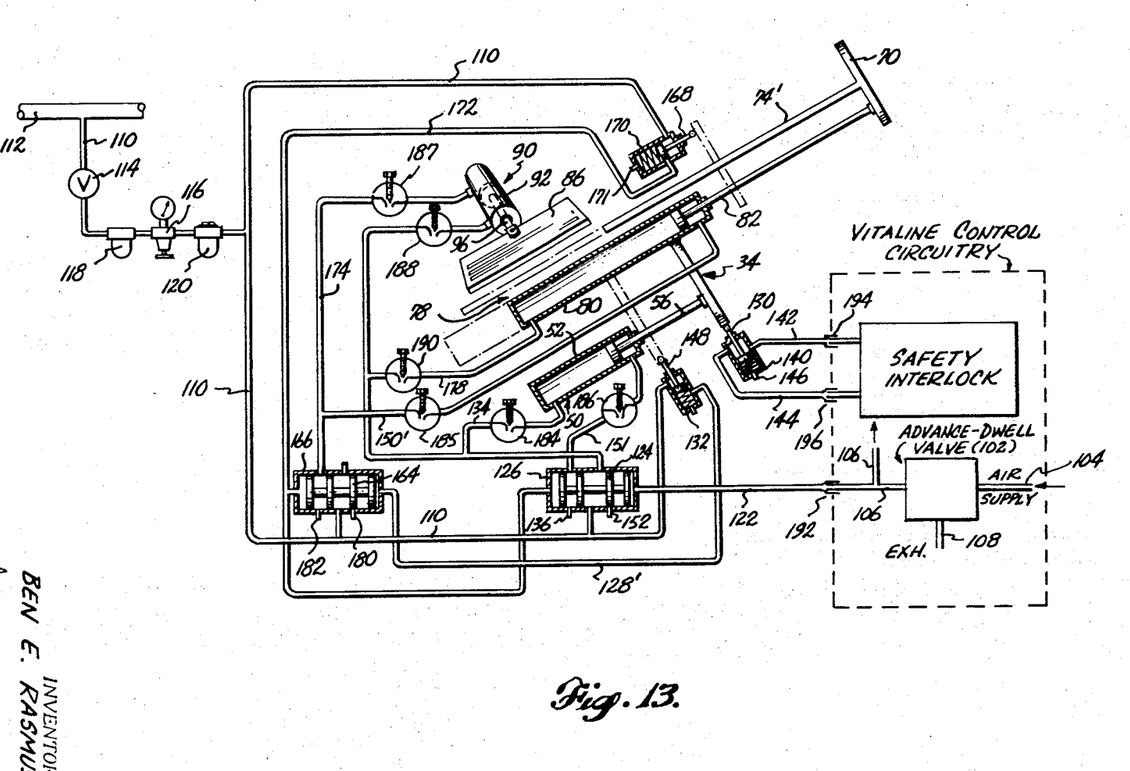
FIG. 13 is a schematic diagram of a typical pneumatic operating and control system for the dispenser mechanism illustrated.

A typical pneumatic control and operation system for the dispenser mechanism F" (FIGS. 9—11) is next described, in conjunction with FIG. 13 of the drawing: As before, at the beginning of a dwell period of the Vitaline mold conveyor C, compressed air is delivered through line 122 and moves spool 124 of valve 126 to the left, the control line 172 on the opposite end of spool 124 from control line 122 being vented to the atmosphere via exhaust port 171 of limit valve 170. The pressurized air in conduit 110 is then channeled through valve 126 into conduit 151 and against the rod side of the piston 56, causing piston 56 to be moved into cylinder 52, and the carriage 34 to be extended toward the fill station, placing the nozzles 66 in the molds M at the fill station. When carriage 34 leaves its retracted position the operator 130 of valve 140 is released, and the safety interlock is put into operation as before. When carriage 34 is fully advanced it contacts and depresses operator 148 of limit valve 132, and this communicates supply conduit 110 with control conduit 128' leading to the right end (as pictured) of the control spool 164 for control valve 166. The opposite end of spool 164 is vented to the atmosphere via conduit 162 and exhaust port 171 of valve 170. Hence, spool 164 is moved to the left, putting supply conduit 110 into communication with both control line 150' leading to the rod side of piston 82, and control line 174 leading to the bare side of closure plate piston 96. Piston 82 is retracted and piston 96 is extended, causing simultaneous advancement of the feed rams 74' and closure of the ram cavities by closure member 86. When the rams 74' have been fully advanced (FIGS. 9 and 10) member 70 contacts and depresses operator 168 of limit valve 170, and this communicates supply conduit 110 with control line 172. At this point of time the Vitaline advance-dwell valve 102 has functioned to vent Vitaline control line 106, and hence feeder control line 122, to the atmosphere via exhaust port 108. Thus, the higher pressure in control line 172 functions to move valve spool 124 of valve 126 and valve spool 164 of valve 166 to the right and into the positions pictured in FIG. 13. This move reverses the direction of pressure differential on piston 56, causing the feed carriage 34' to retract. Then, once operator 148 is released, the direction of pressure differential on pistons 92 and 82 is reversed and simultaneously there is an extension of piston 82, and hence a retraction of the rams 74', and an opening of the closure plate 86.

By way of typical and therefore nonlimitive example, FIG. 12 shows a stick-embedded, nonrefrigerated food product manufactured by the disclosed equipment. It is shown to comprise a main body portion 206, which may be a solidified mixture of dried cereal and suitable binder (of the type heretofore described), for example, and a core (*e.g.* a caramel) of a different food material into which a stick or handle 210 is embedded.

Referring to FIGS. 9—11, when carriage 36 is fully advanced the nozzles 66' extend part way into the molds M, and the prong 204 (or 204') extends a substantial distance into the mold M. The position of prong 204 remains fixed as the rams 74' are advanced. Thus, the mix from hopper 22 is injected into the mold M in the space surrounding and forwardly of the prong 204. The mix is stiff enough that a cavity is left when the prong 204 is withdrawn from the mold M as the carriage 34' is retracted. The caramel or other filling 208 is deposited into the cavities left by the prongs 204 during another dwell and at another station between the fill and stick insertion stations. In addition to adding more flavor to the product FP, the core material 208 may function as a cement for firmly securing the stick or handle 210 to the main ingredient 206 of the food product FP.

From the foregoing discussions of equipment construction characteristic of the invention, various further modifications and adaptations thereof will occur to those skilled in the art to which the invention is addressed.

It will be understood the product delivery nozzles can be arranged vertically when the dispenser apparatus is utilized with an equipment involving an essentially horizontal path of travel of the molds, such as the Gram type automated confection forming equipment. The dispenser mechanism of the invention can also be formed as an integral part of the confection forming equipment, being supported thereby, or from the building structure above the equipment, as desired. With respect to the configuration of the closure plate and component closure bars for enclosing the ram cavities, the configuration of the closure bars can take any desired form, such as a reversal of the slope of the edges thereof from the form shown. As a further variation with respect to how the product mix can be segregated in the ram cavities, the ram cavities if desired can be of essentially cylindrical form, operated in conjunction with rotatable closure sleeves in lieu of a reciprocated closure plate.

As to applications of the type of dispenser mechanism herein disclosed, and with respect to use thereof in conjunction with equipment other than the Vitaline type of equipment illustrated, the mechanism can be employed to deliver successive, measured amounts of the plastic conglomerate mix to any desired product conveying means, such as to a flat conveyor belt, such as in the manner of the feeder mechanism disclosed in Anhanger et al. U.S. Pat. No. 3,203,037, or to a series of trays.

I claim:

1. In combination with an automated confection forming machine comprising a series of receptacles intermittently moved and successively stopped at a fill station; a dispensing unit for dispensing measured amounts of an unfrozen plastic food mass to the series of receptacles as the receptacles are successively stopped at the fill station, said unit comprising: a base, a hopper on said base for holding the plastic food mass, said hopper incorporating heat transfer means to maintain the food mass therein in a plastic condition; plural nozzle means connected to the hopper near the bottom thereof, with the base placing each nozzle in substantial axial alignment with a receptacle at the fill station; feeder means for displacing a measured quantity of food mass from the hopper through each said nozzle into its related receptacle at the fill station; and control means interconnected between said dispensing unit and said confection machine and synchronizing the operation of the feeder means with the movement of the receptacles, the feeder means injecting a measured quantity of the food mass through each nozzle during stoppage of the receptacle at the fill station in a position of alignment with the nozzle, and the series of receptacles being moved ahead after the feeder means has functioned, to place a new empty receptacle in alignment with each nozzle.

2. The combination of claim 1, wherein the said base of the dispenser unit comprises means structurally supporting the unit independently of the automated confection forming machine.

3. The combination of claim 1, wherein said base includes a set of wheels by which it may be wheeled into and away from its position of use relative to the automated confection forming machine, and anchor means for rendering the dispensing unit immovable when in its position of use.

4. The combination of claim 1, wherein said receptacles are molds and said unit comprises means reciprocably moving the plural nozzle means to effect partial entry and retraction thereof into and from the associated molds, said control means controlling such nozzle movement so the nozzles are within the molds only when the molds are stopped.

5. The combination of claim 4, comprising a pneumatic system powering said feeder means and such nozzle movement, said control system comprising limit type pneumatic valves sensing successive positions of components of the said confection forming machine, the said feeder means, and the said nozzle means.

6. The combination of claim 4, wherein said automated confection forming machine is of a type wherein the series of molds are carried by endless conveyor means along a path including a mold return course where the molds progress from an upside down position through an arc of movement to an upright position, and the dispensing unit nozzles at the fill station are arranged to be in alignment with each successive row of molds proceeding along such return course, the lines of alignment of the nozzles with respect to the row of molds being filled therefrom being at a downward acute angle extending substantially radially of the said mold arc of movement.

7. The combination of claim 6, wherein each row of molds include at least six molds and the dispenser unit comprises a like number of nozzle means.